(12) United States Patent
Zhang et al.

(10) Patent No.: US 12,554,944 B2
(45) Date of Patent: Feb. 17, 2026

(54) SYSTEM AND METHOD FOR RULE-BASED LANGUAGE TRANSLATION

(71) Applicant: 7299362 Canada Inc. (o/a Alexa Translations), Toronto (CA)

(72) Inventors: Renxian Zhang, Markham (CA); Hugo Baudchon, Montreal (CA); Ethan Ding, Thornhill (CA); Syed Salman Ali, Scarborough (CA)

(73) Assignee: 7299362 Canada Inc. (o/a Alexa Translations), Toronto (CA)

( * ) Notice: Subject to any disclaimer, the term of this patent is extended or adjusted under 35 U.S.C. 154(b) by 209 days.

(21) Appl. No.: 18/461,999

(22) Filed: Sep. 6, 2023

(65) Prior Publication Data

US 2025/0077800 A1  Mar. 6, 2025

(51) Int. Cl.
*G06F 40/55* (2020.01)
*G06F 40/58* (2020.01)

(52) U.S. Cl.
CPC .............. *G06F 40/55* (2020.01); *G06F 40/58* (2020.01)

(58) Field of Classification Search
CPC .................................. G06F 40/55; G06F 40/58
See application file for complete search history.

(56) References Cited

U.S. PATENT DOCUMENTS 6,879,956 B1 * 4/2005 Honda .................. G10L 15/075
  704/244
8,805,672 B2  8/2014 Caskey et al.
9,530,416 B2  12/2016 Stern et al.
(Continued)

FOREIGN PATENT DOCUMENTS

CN  101510194 A  8/2009
CN  108460028 A  8/2018
(Continued)

OTHER PUBLICATIONS

"International Search Report and Written Opinion" received in connection with PCT/CA2024/051160, mailed Sep. 20, 2024, 13 pages.

(Continued)

*Primary Examiner* — Kevin Ky
(74) *Attorney, Agent, or Firm* — SMART & BIGGAR LP

(57) ABSTRACT

Provided are computer-implemented systems and methods for providing improved rule-based machine translation, including a memory having a plurality of text translations, each text translation comprising an input text element and an output text element; at a processor: generating a text translation cluster comprising a plurality of matching text translations in the plurality of text translations, the text translation cluster associating the plurality of matching text translations; receiving the plurality of matching text translations associated with the text translation cluster; generating a first translation rule corresponding to the input text elements of the text translation cluster and a second translation rule corresponding to the output text elements; generating a machine translation rule based on the first translation rule and the second translation rule, the machine translation rule comprising a template and at least one converter; receiving an input text element for translation; and determining an output translated text element.

22 Claims, 9 Drawing Sheets

(56) References Cited

U.S. PATENT DOCUMENTS

| | | | |
|---|---|---|---|
| 9,547,641 | B2 | 1/2017 | Bostick et al. |
| 9,836,457 | B2 | 12/2017 | Fujiwara et al. |
| 9,910,847 | B2 | 3/2018 | Bittmann |
| 10,019,439 | B2 | 7/2018 | Prokofyev et al. |
| 10,185,713 | B1 | 1/2019 | Denkowski et al. |
| 10,268,685 | B2 | 4/2019 | Zeng et al. |
| 10,437,933 | B1 | 10/2019 | Clifton et al. |
| 11,372,625 | B2 * | 6/2022 | Tanguy ................. G06F 40/117 |
| 11,972,211 | B1 * | 4/2024 | Singh ..................... G06F 40/30 |
| 2003/0083860 | A1 | 5/2003 | Abir |
| 2008/0133245 | A1 | 6/2008 | Proulx et al. |
| 2008/0195372 | A1 | 8/2008 | Chin et al. |
| 2009/0083023 | A1 | 3/2009 | Foster et al. |
| 2010/0299132 | A1 * | 11/2010 | Dolan ..................... G06F 40/49 |
| | | | 704/E15.003 |
| 2012/0173224 | A1 | 7/2012 | Anisimovich et al. |
| 2013/0204885 | A1 * | 8/2013 | Clinchant ............ G06F 16/355 |
| | | | 707/E17.073 |
| 2014/0012564 | A1 | 1/2014 | Hwang et al. |
| 2014/0156567 | A1 * | 6/2014 | Scholtes ................. G06N 5/02 |
| | | | 706/12 |
| 2015/0088484 | A1 | 3/2015 | Bostick et al. |
| 2015/0347397 | A1 | 12/2015 | Venkatapathy |
| 2017/0060854 | A1 | 3/2017 | Zeng et al. |
| 2017/0091177 | A1 | 3/2017 | Sonoo et al. |
| 2017/0161264 | A1 | 6/2017 | Zhao et al. |
| 2018/0189259 | A1 | 7/2018 | Merl et al. |
| 2018/0232451 | A1 | 8/2018 | Lev-Tov et al. |
| 2018/0357531 | A1 * | 12/2018 | Giridhari ............... G06N 3/047 |
| 2019/0087417 | A1 | 3/2019 | Wang et al. |
| 2020/0026766 | A1 | 1/2020 | Ji et al. |
| 2020/0098352 | A1 | 3/2020 | Karanasou et al. |
| 2020/0320255 | A1 | 10/2020 | Xing et al. |
| 2021/0042475 | A1 * | 2/2021 | Zhang .................... G06N 3/082 |
| 2021/0334478 | A1 | 10/2021 | Greenberg et al. |
| 2023/0081879 | A1 * | 3/2023 | Tan ....................... G06F 16/355 |
| | | | 704/9 |
| 2023/0097150 | A1 * | 3/2023 | Agrawal ................ G06F 40/18 |
| | | | 715/212 |
| 2023/0152598 | A1 | 5/2023 | Brebner et al. |
| 2025/0077783 | A1 * | 3/2025 | Chen ..................... G06F 40/35 |
| 2025/0077800 | A1 * | 3/2025 | Zhang ................... G06F 40/55 |

FOREIGN PATENT DOCUMENTS

| | | |
|---|---|---|
| CN | 110059323 A | 7/2019 |
| WO | 2022213197 A1 | 10/2022 |

OTHER PUBLICATIONS

Babel Team, Babel—2.12 documentation, Sep. 6, 2023. Retrieved from Internet: https://web.archive.org/web/20230906115345/https://babel.pocoo.org/en/latest/), 2 pages.

WIPO Media Center, Press Releases 2017, "WIPO Translate: Cutting-Edge Translation Tool for Patent Documents Extends Language Coverage", Geneva, PR/2017/809, Sep. 25, 2017 (Sep. 25, 2017), https://www.wipo.int/pressroom/en/articles/2017/article_0007.html.

* cited by examiner

SYSTEM AND METHOD FOR RULE-BASED LANGUAGE TRANSLATION

FIELD

The described embodiments relate to language translation.

BACKGROUND

Communication between human beings is made possible by a variety of different language systems that allow individuals to exchange ideas. Languages allow humans to undertake linguistic behavior, including learning languages and understanding utterances. Languages further allow for a formal system of signs that are governed by grammatical and semantic rules to communicate meaning.

The development of language, and an individual's understanding of a given language, are often culturally linked. While individuals are often bi-lingual, tri-lingual, or multi-lingual, it is often challenging and time consuming for ideas to be communicated between individuals in different languages.

In the past, language translation was a problem solved by human translators fluent in a source and a target language. Such human driven solutions are expensive and time consuming, and subject to limitations in accuracy based on the proficiency of the translator. Current systems and methods for machine language translation, such as Google® Translate® may provide for the machine translation of written text between two different languages, however their accuracy in translation is limited.

Language translation in professional domains (legal, financial, etc.) may require the translation of highly formulaic expressions and sentence patterns. While Statistical Machine Translation (SMT) and Neural Machine Translation (NMT) may function to translate these highly formulaic expressions and sentence patterns, the standards for translation may be higher in professional domains. As such, in addition to SMT or NMT, rule-based machine translation (RBMT) may be used.

RBMT may be one of the first and fastest responders to translation errors. RBMT however has drawbacks. Namely, it may lack linguistic resources. That is to say, the rules must be created and currently cannot be automatically determined through training the same way that SMT or NMT can. This means that RBMT may be very expensive and difficult to implement. RBMT may also have difficulties dealing with ambiguous input, or situations where input deviates from expected parameters.

There is a need therefore for improved systems and methods of rule-based machine translation that can operate in parallel with conventional SMT or NMT-based machine translation systems.

SUMMARY

In order to solve aspects of the problems associated with language translation, there is provided a system and method of language translation that provides for improved accuracy in rule-based translation.

In a first aspect there is provided a computer-implemented method for rule-based machine translation, the method comprising: providing, at a memory, a plurality of text translations, each text translation comprising an input text element and an output text element; generating, at a processor in communication with the memory, a text translation cluster, the text translation cluster comprising a plurality of matching text translations in the plurality of text translations, the text translation cluster associating the plurality of matching text translations; receiving, at the processor, the plurality of matching text translations associated with the text translation cluster; generating at the processor, a first translation rule corresponding to the input text elements of the text translation cluster and a second translation rule corresponding to the output text elements of the text translation cluster, each of the first translation rule and the second translation rule; generating, at the processor, a machine translation rule based on the first translation rule and the second translation rule, the machine translation rule comprising a template and at least one converter; receiving, at the processor, an input text element for translation; and determining, at the processor, an output translated text element based on an application of the machine translation rule to the input text.

In one of more embodiments, the input text element for translation may be received in a translation request; and a Rule-based Machine Translation (RBMT) component may perform the determining, at the processor, the output translated text element.

In one or more embodiments, the machine translation rule may further comprise at least one assembler, the assembler for generating a unified data structure using the template and the at least one converter.

In one or more embodiments, the processor may be further configured to generate the text translation cluster using a clustering algorithm by: generating a plurality of vector-based representations from the plurality of text translations, where the plurality of n-gram BOW vectors comprise at least one combination of unigrams, bigrams and trigrams; and performing clustering on the plurality of vector-based representations.

In one or more embodiments, the vector-based representations may comprise at least one selected from the group of: a plurality of n-gram bag-of-words (BOW) vectors, and a plurality of term-frequency inverse-document frequency vectors or a plurality of vectors of words embeddings from other techniques.

In one or more embodiments, the n-gram bag-of-words (BOW) vectors may comprise at least one selected from the group of: a plurality of unigram vectors, a plurality of bigram vectors and a plurality trigram vectors.

In one or more embodiments, the performing clustering may comprise performing clustering based on at least one selected from the group of: k-means clustering, agglomerative clustering, and DBSCAN clustering.

In one or more embodiments, at least one of the first translation rule and the second translation rule may comprise at least one selected from the group of: a regular expression rule and a finite state automata rule.

In one or more embodiments, the processor may be further configured to store the machine translation rule in a machine translation rule database.

In one or more embodiments, the processor may be further configured to determine whether the machine translation rule exists in the machine translation rule database.

In one or more embodiments, the at least one converter may comprise a representation of a variable text expression from the plurality of matching text translations.

In one or more embodiments, the template may comprise a static representation portion of a text expression from the plurality of matching text translations and a variable representation portion of the text expression.

In one or more embodiments, the plurality of text translations may be provided in plain-text format.

In a second aspect, there is provided a computer-implemented system for rule-based machine translation, the system comprising: a memory, comprising: a plurality of text translations, each text translation comprising an input text element and an output text element; a processor in communication with the memory, the processor configured to: generate a text translation cluster, the text translation cluster comprising a plurality of matching text translations in the plurality of text translations, the text translation cluster associating the plurality of matching text translations; receive the plurality of matching text translations associated with the text translation cluster; generate a first translation rule corresponding to the input text elements of the text translation cluster and a second translation rule corresponding to the output text elements of the text translation cluster, each of the first translation rule and the second translation rule; generate a machine translation rule based on the first translation rule and the second translation rule, the machine translation rule comprising a template and at least one converter; receive an input text element for translation; and determine an output translated text element based on an application of the machine translation rule to the input text.

In one of more embodiments, the input text element for translation may be received in a translation request; and a Rule-based Machine Translation (RBMT) component may perform the determining, at the processor, the output translated text element.

In one or more embodiments, the machine translation rule further may comprise at least one assembler, the assembler for generating a unified data structure using the template and the at least one converter.

In one or more embodiments, the processor may be further configured to generate the text translation cluster using a clustering algorithm by: generating a plurality of vector-based representations from the plurality of text translations, where the plurality of n-gram BOW vectors comprise at least one combination of unigrams, bigrams and trigrams; and performing clustering on the plurality of vector-based representations.

In one or more embodiments, the vector-based representations may comprise at least one selected from the group of: a plurality of n-gram bag-of-words (BOW) vectors, and a plurality of term-frequency inverse-document frequency vectors or a plurality of vectors of words embeddings from other techniques.

In one or more embodiments, the n-gram bag-of-words (BOW) vectors may comprise at least one selected from the group of: a plurality of unigram vectors, a plurality of bigram vectors and a plurality of trigram vectors.

In one or more embodiments, the performing clustering comprises performing clustering based on at least one selected from the group of: k-means clustering, agglomerative clustering, and DBSCAN clustering.

In one or more embodiments, at least one of the first translation rule and the second translation rule may comprise at least one selected from the group of: a regular expression rule and a finite state automata rule.

In one or more embodiments, the processor may further be configured to store the machine translation rule in a machine translation rule database.

In one or more embodiments, the processor may further be configured to determine whether the machine translation rule exists in the machine translation rule database.

In one or more embodiments, the at least one converter may comprise a representation of a variable text expression from the plurality of matching text translations.

In one or more embodiments, the template may comprise a static representation portion of a text expression from the plurality of matching text translations and a variable representation portion of the text expression.

In one or more embodiments, the plurality of text translations may be provided in plain-text format.

BRIEF DESCRIPTION OF THE DRAWINGS

A preferred embodiment will now be described in detail with reference to the drawings, in which.

DESCRIPTION OF EXEMPLARY EMBODIMENTS

Figure 1:
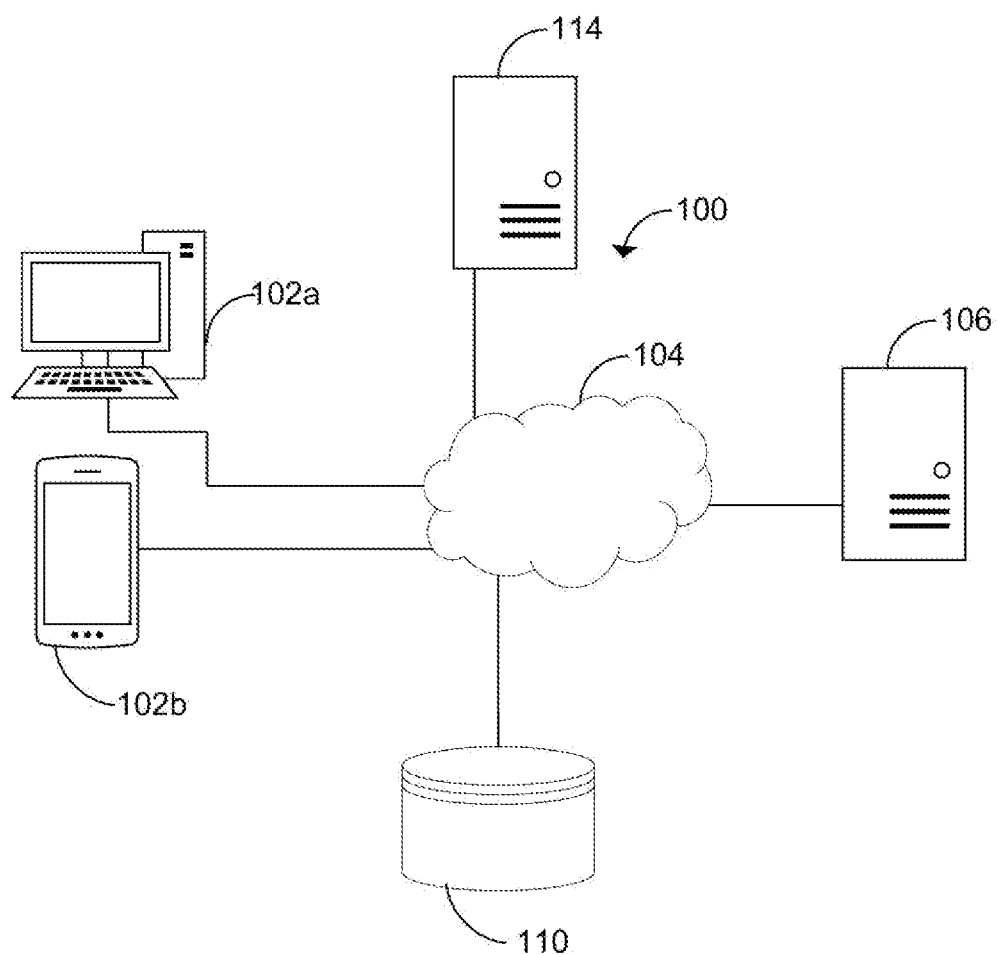
FIG. 1 is a system diagram of the language translation system in accordance with one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

Reference is first made to FIG. 1, which illustrates a language translation system 100. The system 100 has a plurality of user devices, represented by user devices 102a-102b, network 104, a translation server 106, and database 110.

User devices 102 may be used by an end user to access an application (not shown) running on translation server 106 over network 104. For example, the application may be a web application, or a client/server application. The user devices 102 may be a desktop computer, mobile device, or laptop computer. The user devices 102 may be in network communication with translation server 106 via network 104. The user devices 102 may display the web application, and may allow a user to request machine translations, submit post-edits, submit machine classifications, and submit quality evaluations of machine translations. The user of user devices 102 may also be an administrator user who may administer the configuration of the translation server 106.

The translation server 106 is in communication with the database 110 and client server 114 along with user devices 102. The translation server may provide a web application, or a client/server application, and provides functionality to generate language translations.

The translation server 106 may accept as input a text element. The text element may be in a wide variety of formats, including various text encodings such as ASCII and Unicode. The translation server 106 receives from a training server (not shown) a plurality of language translation models, machine selection models, post-editing models, and quality evaluation models.

The translation server 106 may generate an output item, including an output text element. The output text element may be provided in a variety of different formats, such as HTML when the translation is requested through the web application, or JavaScript Object Notation (JSON) or eXtensible Markup Language (XML) when the translation is requested through an Application Programming Interface (API). The output text may be provided in the same format as was provided upon input.

The translation server 106 may provide an API endpoint for integration with a client software application on client server 114 to provide translations. This may allow a client software application to send language translation requests to the system 100. The translation server 106 may also generate language translation models, machine selection models, post-editing models, and quality evaluation models based on a language model generation request.

The language translation request may include a specified input language, an output language, an item to be translated such as one or more text elements, one or more documents, one or more databases, or a combination thereof. The language translation request may include metadata associated with the item to be translated. In one embodiment, the specified input language in the translation request may be optional and the language translation system 100 may detect the input language from the item to be translated. The translation server 106 may determine a translation of the text element in the translation request and transmit the output (or final) text element in a translation response.

The language model generation request may include an input language, an output language, and a document corpus comprising a plurality of translated items. Each translated item may include text inputs in an input language, such as one or more text elements, one or more documents, one or more databases, or a combination thereof. Each translated item further includes text outputs in an output language corresponding to translated versions of the associated text input, such as one or more text elements, one or more documents, one or more databases, or a combination thereof.

The document corpus may include metadata associated with each text element (both the input/source text elements and the output/translated text elements). A text element may be associated with a plurality of metadata. The metadata may include a user identifier associated with a user who submitted the input text element, a user identifier associated with a user who translated the input text element into the corresponding output text element, a machine translator identifier associated with the machine translation model used to translate the input text element into the corresponding output text element, one or more timestamps associated with the input text element (such as a created time, a modified time, etc.), one or more timestamps associated with the input text element (such as a created time, a modified time, etc.), the language of an input text element, and the language of a translated text element. If the input text element has been post-edited, the metadata associated with the input text element may include a text element identifier associated with the post-edited sentence. If the text element has had a quality evaluation performed, the metadata may include a quality metric identifier associated with the quality evaluation. The text-element metadata may include a document identifier associated with a parent document, a paragraph identifier associated with a parent paragraph, and a phrase identifier. The text element metadata may include an associated client identifier, and a source identifier associated with the particular client application sourcing the text element. The text element metadata may include a text encoding such as UTF-8, and a text element size (in both number of characters and the size).

In one embodiment, the specified input language in the translation request may be optional and the language translation system 100 may detect the input language from the item to be translated.

In one embodiment, the translation request may be satisfied by a neural translation model such as a Transformer model.

In another embodiment, the translation request may be satisfied by a Rule-Based Machine Translation (RBMT) component that performs the translation.

In another embodiment, a machine selector model may be used to select the RBMT component to translate the translation request.

In another embodiment, the machine selector model may be used to select a neural translation model from a plurality of translation models.

In another embodiment, a machine selection model generation request may be received and handled by a machine selection model generator, the request may include machine classification data, and the request may be for the generation of a machine classification model.

In another embodiment, a post-editing model generation request may be received and handled by the post-editing model generator, the request may include post-editing data, and the request may be for the generation of a post-editing model.

In another embodiment, a quality evaluation model generation request may be received and handled by the quality evaluation model generator, the request may include quality evaluation data, and the request may be for the generation of a quality evaluation model.

Client server 114 may run a client application requiring language translation services from system 100. The client server 114 is in network communication with the translation server 106. The client server 114 may further include an Rule-Based Machine Translation (RBMT) application that may provide a user with the ability to add, remove, review, or edit translation rules that are applied by translation server 106. Each translation rule may include assemblers, templates, and converters as described herein. The users using devices 102 may access the client server 114 and may provide access to the RBMT component for configuring the RBMT rules which may be used in conjunction with SMT or NMT models such as a Transformer-based translation model.

Network 104 may be a communication network such as the Internet, a Wide-Area Network (WAN), a Local-Area Network (LAN), or another type of network. Network 104 may include a point-to-point connection, or another communications connection between two nodes.

The database 110 is connected to network 104 and may store translation information including language translation data sets (a language translation data set is also referred to herein as a "corpus"), machine classification data sets, post-editing data sets, quality evaluation data sets, rule-base translation data sets, and other language translation information. The database 110 may be a Structured Query Language (SQL) such as PostgreSQL or MySQL or a not only SQL (NoSQL) database such as MongoDB.

Figure 2:
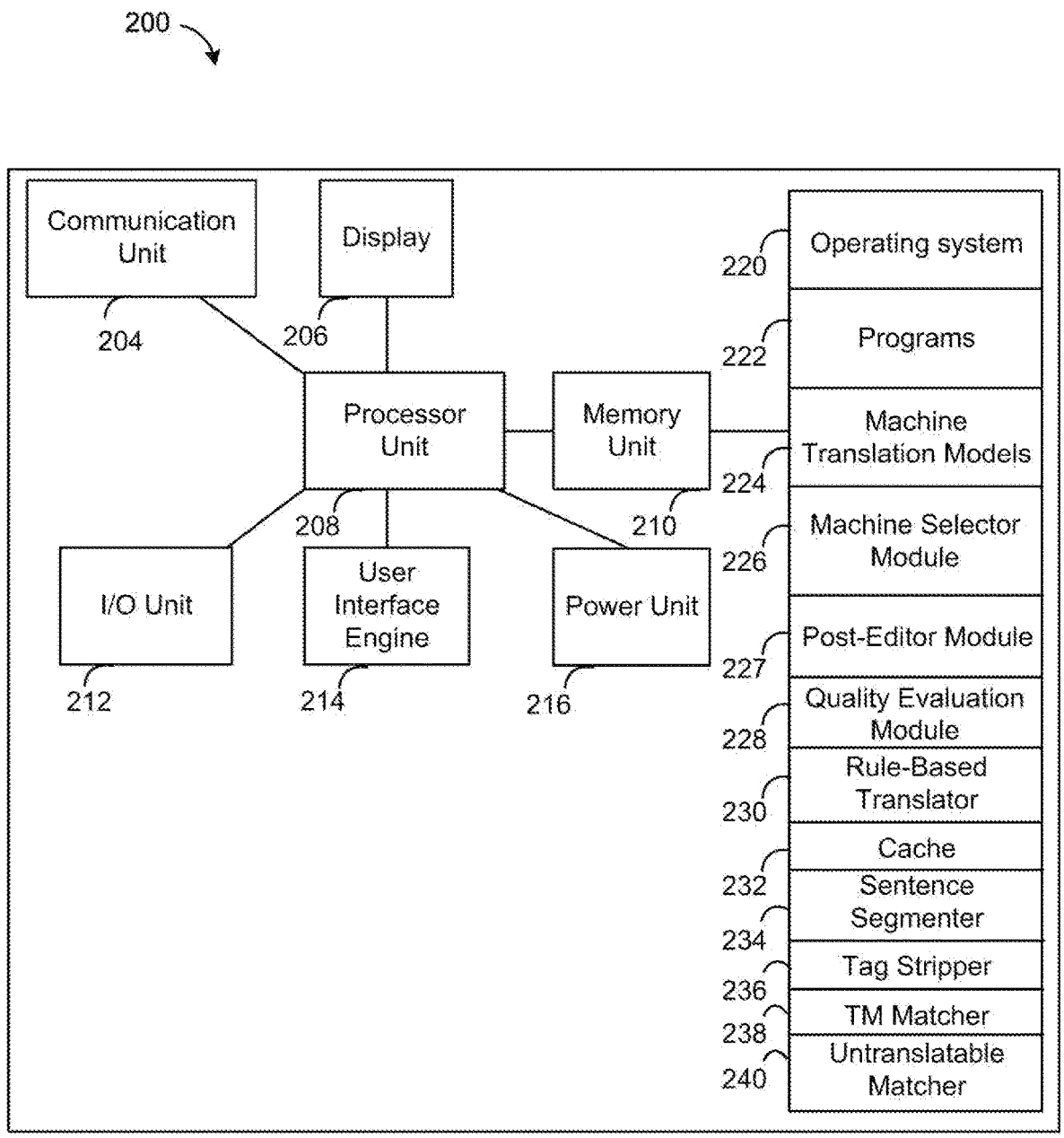
FIG. 2 is a block diagram of an embodiment of server 106 from FIG. 1 for language translation in accordance with one or more embodiments.

Reference is next made to FIG. 2, showing a block diagram 200 of the translation server 106 from FIG. 1. The translation server 200 has communication unit 204, display 206, processor unit 208, memory unit 210, I/O hardware 212, user interface 214, and power unit 216. The memory unit 210 has operating system 220, programs 222, a plurality of machine translation models 224, a machine selector module 226, a post-editor module 227, a quality evaluation module 228, a rule-based translator 230, a cache 232, a sentence segmenter 234, a tag stripper 236, a TM matcher 238.

The communication unit 204 may be a standard network adapter such as an Ethernet or 802.11x adapter. The processor unit 208 may include a standard processor, such as the Intel® Xeon® processor, for example. Alternatively, there may be a plurality of processors that are used by the processor unit 208 and may function in parallel.

The processor unit 208 can also execute a graphical user interface (GUI) engine 214 that is used to generate various GUIs, some examples of which are shown and described herein. The user interface engine 214 provides for language translation layouts, rule-based machine translation layouts, machine classification layouts, post-editing layouts, and quality evaluation layouts for users to request translations, and the information may be processed by the machine translation models 224, the machine selector module 226, the post-editor module 227, the quality evaluation module 228, and the rule-based translator 230.

The user interface engine 214 provides translation layouts for users to translate text elements from a first language to a second language. User interface engine 214 may be an API, a client-server application, or a Web-based application that is accessible via the communication unit 204.

Memory unit 210 may have an operating system 220, programs 222, a plurality of machine translation models 224, a machine selector module 226, a post-editor module 227, a quality evaluation module 228, and a rule-based translator 230.

The operating system 220 may be a Microsoft Windows Server operating system, or a Linux-based operating system, or another operating system.

The programs 222 comprise program code that, when executed, configures the processor unit 208 to operate in a particular manner to implement various functions and tools for the translation server 200.

The plurality of machine translation models 224 provides functionality for the translation of input text elements from a first language to a second language to generate a first translated text element. The plurality of translation models 224 may be general language translators, for example, English to German. Each machine translation model translates the text element from a first language to a second language and produces a first output text element. The first output text element may be sent to the post-editor module 227 and the quality evaluation module 228. The input text element received at the selected machine translation model in the plurality of machine translation models 224 may be sent by the machine selector module 226.

In another embodiment, the plurality of translation models 224 may be domain specific translation models, for example there may be individual machine translators for Finance, Legal, Clothing, Electronics, Travel, and Sports within a group of English to German translators. The plurality of translation models may include both statistical and neural translation processes.

In another embodiment, the plurality of translation models 224 may include a combination of general language translators (for example, English to German) and domain specific translation models (for example, Finance, Legal, Clothing, Electronics for English to German translations).

A statistical translation model may provide language translation between a first language and a second language using a probabilistic model determined from a bilingual corpus of text elements. To determine a translated text element, a string of words may be determined that maximizes $f^*$ as follows:

$$f^* = \mathrm{argmax}\, P(f \mid e) = \mathrm{argmax}\, P(e \mid f)\, P(f) \qquad \text{(equation 1)}$$

In equation 1, P($f$) is referred to as the target language model, and represents how probable a given sentence is in the target language. P(e|$f$) is referred to as the translation model, and represents how probable a first language text element is as a translation for a given text element in a second language. The translation model may be determined using Bayes Theorem or another suitable algorithm. The statistical translation models may include word-based translation models, phrase-based translation models, and syntax-based translation models.

The method of translation for a statistical translation model is generally as follows: first a text element in a first language is broken up into phrases. Next, for each phrase a corresponding phrase in a second language is determined. Finally, a permutation of the translated phrases is selected. The resulting set of permutations are evaluated and a nearly-most-probable translation is chosen as the output text element. The above statistical translation method may be modified to incorporate other known statistical translation steps.

A neural translation model may employ a pair of Recurrent Neural Networks (RNNs).

The first RNN accepts input text elements for translation and produces an internal fixed-length representation, also known as the context vector (an encoder). The encoder transforms the input text element into a list of vectors, including one vector per input symbol. For example, with an input text element $X = x_1, x_2, x_3 \ldots, x_m$ and an output text element $Y = y_1, y_2, y_3, \ldots, y_n$. The set of vectors (bolded) produced by the encoder may be determined as follows:

$$\mathbf{x_1, x_2, x_3 \ldots, x_m} = \mathrm{EncoderRNN}(x_1, x_2, x_3 \ldots, x_m) \qquad \text{(equation 2)}$$

The conditional probability of the sequence P(Y|X) is as follows:

$$P(y \mid X) = P(Y \mid x_1, x_2, x_3 \ldots, x_m) = \prod_{i=1}^{N} P(y_i \mid y_0, y_1, y_2, \ldots, y_{i-1}; x_1, x_2, x_3 \ldots, x_m) \qquad \text{(equation 3)}$$

The second RNN is for generating output text elements based on the context vector (a decoder). A neural translation model may include an attention mechanism to address situations where long text elements are used as input. During language translation, the probability of the next symbol in the output text element Y is determined given the input text element and the decoded output text element translated so far:

$$P(y_i \mid y_0, y_1, y_2, \ldots, y_{i-1}; x_1, x_2, x_3 \ldots, x_m) \qquad \text{(equation 4)}$$

In some embodiments, the neural translators in the plurality of translation models 224 may include an attention layer. The attention layer may include a local attention model and a global attention model. The global attention model may represent hidden states of an encoder when determining a context vector. The global attention model may use a location-based function for determining alignment scores of a vector representation of an input text element. The local attention model may predict a single aligned position for the current word being translated, and a window centered around the single aligned position to determine a context vector.

In another embodiment, the neural translation model may be a Transformer.

Like an RNN based machine translation model, Transformer based machine translation model may consist of two modules, an encoder and a decoder.

The encoder accepts input text elements for translation and generates a vector representation of all words in source text. The decoder accepts the vector representation and generates a corresponding sequence of words as an output text element. The input and output of the encoder and decoder are similar to the first RNN and second RNN as described above, however the underlying architecture and method of the encoder and decoder of the Transformer are different from the pair of RNNs.

The encoder of the Transformer may have a plurality of layers where each layer is further composed of two components. The first component constitutes a multi-head self-attention mechanism that is applied to each token of input text, and second component consists of fully connected feed forward network.

A self-attention mechanism functions by processing an input token, and associating the current token with other token positions in the sequence of input tokens for information and clues that may provide a better encoding of the input token.

The decoder of the Transformer may have a plurality of layers where each layer is composed of three components. Two of the components are a multi-head self-attention mechanism and fully connected feed forward network. In addition to these two components, there is a third component which performs multi-head attention over the output of encoder layer.

The multi-head attention mechanism consists of an attention function which determines a Query (Q) vector and a set of Key(K)-Value(V) vector pairs from the input token, and transforms Q, K and V to an output vector. The output vector may be a weighted sum of Value vectors where the weight assigned to each Value vector is computed by a function of Query vector with the corresponding Key vector.

The attention mechanism may proceed as follows.

$$\text{Attention}(Q, K, V) = \text{softmax}\left(\frac{QK^T}{\sqrt{d_k}}\right)V$$

Where Q, K and V represents Query, Key and Value vectors respectively and $d_k$ represents the dimension of Key vectors. The softmax function may be used to compute the weights for Value vectors. $K^T$ refers to a matrix transposition of the key matrix.

In a multi-head attention method, the attention function may be repeated multiple times with different learned vector representation Query, Key and Value vectors.

The multi-head attention method in a Transformer may function in three ways. First, multi-head attention may be determined or performed by the encoder over one or more tokens of an input text element in a source language. Query, Key and Value vectors may be determined from the tokens of input text in source language thus may be called self-attention mechanism. Second, multi-head attention in the decoder may be performed over tokens decoded as an output text element corresponding to a translation in a target language. In this second case, all Query, Key and Value vectors may be from same location—tokens from the output text element (the resultant translation). Third, multi-head attention may be applied across both the encoder and decoder. In this case, Query vectors may come from decoder and Key and Value vector pairs may come from the output of encoder.

In another embodiment, the neural translation model may be an Evolved Transformer (ET), which may provide improved results in a range of language tasks. In order to generate the ET, a large search space may be constructed. The ET may incorporate advances in feed-forward sequence models, and may execute an evolutionary architecture search with warm starting by seeding the initial population of Transformer models.

Two methods may be used to create the Evolved Transformer architecture: Tournament Selection Evolutionary Architecture Search (TSEAS) and Progressive Dynamic Hurdles (PDH).

TSEAS may be conducted by first defining a gene encoding that describes a neural network architecture, in our case is the Transformer architecture. An initial population may be created by randomly sampling from the space of our Transformer gene encodings to create individuals with each individual corresponding to a neural architecture. These individuals may be trained and assigned fitness, where the fitness may be determined by the model's negative log perplexities on the Workshop on Machine Translation 2014 (WMT'14) English-German validation set. The population may be then repeatedly sampled to produce sub-populations, from which the individuals with highest fitness may be selected as a parent. Selected parents may have their gene encodings mutated to produce child models. The child models may then be trained and evaluated. The population may again be sampled and individuals in the sub-population with lowest fitness may be removed from the population and newly evaluated child models may be added to the population. This process is repeated and may result in a population of high-fitness individuals, meaning high-fitness architectures.

The training and evaluation of a Transformer model on the WMT'14 English-German validation has high resource and time requirements, and the application of the TSEAS method to produce high fitness models may be very expensive. To address these high resource and time requirements, Progressive Dynamic Hurdles (PDH) may be used. PDH may allow models that consistently perform well to train for more steps, and may halt models that do not consistently perform well earlier. The PDH method may begin similar to the ordinary TSEAS method, but with early stopping, with each child model training for a small number of steps before evaluation. First, a predetermined M child models are evaluated after $S_0$ steps of training, then a hurdle $H_0$ may be introduced by averaging these models' fitness. Then for the next M child models, those models which achieve a fitness higher than $H_0$ after $S_0$ steps may be granted an extra $S_1$ training steps and evaluated again to get their final fitness. Next another hurdle $H_1$ may be obtained by determining the mean fitness of all current population. For the subsequent M child models, training and evaluation may follow the same fashion. This process may be repeated until a satisfactory number of maximum training steps is reached. The benefit of altering child models this way may be that poor performing child models will not consume as many resources when their fitness is being computed. The resources saved as a result of discarding many bad models may improve the overall quality of the search enough to justify potentially also discarding some good ones.

In another embodiment, the plurality of translation models may include $3^{rd}$ party translation models such as Google® Translate®. In the case where a $3^{rd}$ party translation model is used, the translation system may implement $3^{rd}$ party library code to provide language translation using a $3^{rd}$ party service. The $3^{rd}$ party models may be used as a translation model for particular domains not in the domain specific translators of the plurality of translation models. The translated text elements generated by the $3^{rd}$ party models may be sent to the post-editor module and the quality evaluation module, or alternatively, the translated text elements generated by the $3^{rd}$ party models may be used as the final translated text elements directly.

The machine selector module 226 determines, based on an input text element, which of the plurality of machine translation models is "in-domain" for the input text element. The machine selector module 226 may be rule-based, and may select a translation model in the plurality of machine translation models based on the application of a ruleset.

In another embodiment, the machine selector module 226 may also determine that the rule-based machine translation module 230 may be selected to perform the translation of the input text element.

In another embodiment, the machine selector module 226 may use a classifier machine learning model that is determined based on a training set of previously classified sentences. The previously classified sentences may be a set of previously human-classified sentences. The classification may be based on the text data of the sentence, and on sentence metadata.

The machine selector module 226 may receive the input text element when the rule-based translator 230 does not match the input text element. The machine selector module 226 may select a plurality of different machine translation models for text elements originating from the same document. For example, a finance document being translated from English to French may have a domain specific finance machine translation model used for text elements in some parts of the document, and may have a $3^{rd}$ party translation model used for other text elements in the document.

The machine selector module 226 is a machine learning classifier that selects one model from the plurality of machine translation models for the translation of the text element. The machine selector module 226 may use the doc2vec algorithm and logistic regression-based machine learning algorithm to classify sentences as either in-domain or out-of-domain for each of a plurality of machine translation models, including statistical machine translation models, neural machine translation models, and $3^{rd}$ party translation models.

In an alternate embodiment, the machine selector module 226 may use a Bidirectional Encoder Representations for Transformers (BERT) algorithm and logistic regression machine learning algorithm to classify sentences as either in-domain or out-of-domain.

The machine selector module 226 may receive feedback from the quality evaluation module 228. The feedback from the quality evaluation module 228 may be used in future training of the machine selector model to improve the accuracy of machine selection predictions.

The machine selector module 226 may determine the best translation model to be used for a text element based on pre-determined goal parameters such as quality metrics, language metrics, or cost metrics (or a combination thereof).

The post-editor module 227 functions to predict post-edits to the first translated text element. The predicted post-edits may be applied to the translated text element in a second text element. The post-editor may receive the first translated text element from the selected machine translator in the plurality of machine translation models 224. The post-editor module 227 may send the generated second text element to the quality evaluation module 228. The generated post-edits, including the first translated text element and the second translated text element may be associated with each other and stored in a database (for example, database 110 in FIG. 1).

The post-editor module 227 may be rule-based, and may perform post-edits based on a set of predetermined rules in a ruleset.

In an alternate embodiment, post-editor module 227 may have a SMT or NMT model for predicting post-edits of the first translated text element. The NMT may be a deep neural network.

The quality evaluation module 228 functions to predict quality evaluation metrics of the first translated text element and the second translated text element. The predicted quality metrics may be numerical (i.e. a range from 0-1, or 0-100), or may be categorical (i.e. letter categories "A", "B", "C", "D", or "Good", "Mediocre", "Bad", etc.). The quality evaluation module 228 receives the first translated text element from the selected machine translation model in the plurality of machine translation models, and the second translated text element from the post-editor module.

The quality evaluation module 228 determines a first quality metric associated with the first translated text element and a second quality metric associated with the second translated text element. The quality metrics may be determined using a rule-based approach, whereby a set of pre-determined rules are identified in a ruleset that identifies text element quality.

In an alternate embodiment, the first quality metric and the second quality metric may be sent as feedback to the post-editing module 227, and may be incorporated into the post-editing model. The quality metrics generated by the quality evaluation module may be stored in a database (for example, database 110 in FIG. 1) with the associated text element.

In an alternate embodiment, the quality evaluation module 228 may determine quality metrics using the Bilingual Evaluation Understudy (BLEU) algorithm. The BLEU metrics generally determine the level of correspondence between a machine's translation output text element in a second language based on an input text element in a first language as compared to a professional human translator. A BLEU score is a quality score metric determined using a linear regression. The BLEU score may be determined based on a number of features, including basic sentence features such as number of tokens in sentence, average token length etc., n-gram related features such as number of unique trigrams in sentence without padding, four-gram language model probability of sentence etc., punctuation-related features such as absolute difference between the number of punctuations marks of source and target sentence, absolute difference between number of periods in source and target sentences normalized by source sentence length, etc., digit-related features such as percentage of digits in the sentence, absolute difference between number of numbers in the source and target sentences, etc., linguistic features such as perplexity of sentence, the number of stop-words in the sentence, sentence four-gram log-probability normalized by sentence length, ratio of percentage of nouns in the source and target sentences, etc.

In an alternate embodiment, the quality evaluation module 228 may have a quality evaluation model that may predict the quality metrics associated with a machine's translation output text element in a second language based on an input text element in a first language using a neural network. The predicted quality metrics based on the neural network may be determined using a model determined from a corpus of historical quality evaluations by human evaluators.

The quality evaluation model 228 may determine a final text element based on the first quality metric and the second quality metric. For example, the final text element may be selected by the quality evaluation module 228 based on the highest quality metric of the first quality metric and the second quality metric.

In an alternate embodiment, the quality evaluation model 228 may compare the generated first quality metric and the second quality metric to a threshold, and if both metrics are below the threshold, may transmit the input text element to a $3^{rd}$-party translation model in the plurality of translation models 224 to generate the final text element (instead of selecting from the first translated text element and the second translated text element).

In one embodiment, once the final text element is selected by the quality evaluation module, it is stored in cache 232.

Rule-based translator 230 may optionally be used to perform translations based on a pre-determined set of matching rules. The rule-based translation has a plurality of translation rules, and the rules are applied to input text elements matching the condition of the rule as described in further detail in FIGS. 6-12.

The rule-based translator 230 may apply its rules prior to the input text element sent to the machine selector module 226 if the input text element matches the rule. If no rules match the input, the input text element may then proceed to the machine selector module 226.

Each rule in the rule-based translator 230 may be implemented using a regular expression. A regular expression may therefore apply before an input text element is selected for translation at a machine translation model in the plurality of machine translation models. The regular expression may therefore override the translation decisions of the plurality of translation models to provide culturally relevant output, for example moving a currency sign to after the number or replacing a decimal with a comma. In a specific example, the rule-based engine may be used, when there is particular matching "boilerplate" text in a securities document.

Cache 232 may be an in-memory collection of text element values referenced by a cache key. The cached values may be commonly translated text elements, and the provision of the cache may improve the translation performance of the system. The cache key may be the input text element, or a hash of the input text element. Newly translated text elements may be stored in the cache 232 by the quality evaluation module 228. As the cache 232 reaches capacity, newly translated text elements may be added using a Least-Recently Used (LRU) cache replacement policy. The cache 232 may be in memory, or alternatively may be stored on disk at the translation server 200.

Cache 232 may be a software package such as memcached, redis, etc.

Sentence segmenter module 234 may receive the input text element and may split the input text element into a plurality of text element segments. For example, as shown herein, the input text element may contain a plurality of paragraphs, with each paragraph having a plurality of sentences. The segmentation may take the original input text element and enumerate each sentence as PnSm, where m is an index referring to the sentence number and n is an index referring to the paragraph number (see e.g. FIG. 6).

Tag stripper module 236 may receive the plurality of text element segments from the sentence segmenter 234 and may remove the formatting tags included in each segment. These formatting tags may include those associated with the text encoding, such as Unicode, UTF-8, ISO 8859. The formatting tags may further include markup tags associated with the document from which the text element originates, for example, HTML or XML tags applied to markup the formatting of the document.

TM matcher module 238 may include a Translation Memory (TM) for matching known translations, or a collection of translation examples. The translations in the TM may be pre-reviewed and human-verified. Therefore, if a source text element is the same as one of the source texts in the TM, its corresponding output text element may be looked up in TM and output. This lookup and retrieval process may be referred to as TM matching.

Untranslatable matcher 240 may be used to match input text elements that should not be translated and instead passed through directly. For example, some source texts may be invariant across languages such as text elements referring to email addresses, urls, product serial numbers, etc. In these situations, the appropriate translation action is to copy the contents verbatim from the source text element to the output text element. These source text elements may be referred to as "untranslatables". In the present systems and methods, an Untranslatable matcher 240 is provided that, given a certain source text, determined whether it is untranslatable or not. If it is, the system outputs the source text element as the output text element absent further translation. If it is not, then the source sentence may flow further into the next components in the pipeline, including RBMT.

I/O hardware 212 provides access to server devices including disks and peripherals. The I/O hardware provides local storage access to the programs 222 running on translation server 200.

The power unit 216 provides power to the translation server 200.

Figure 3:
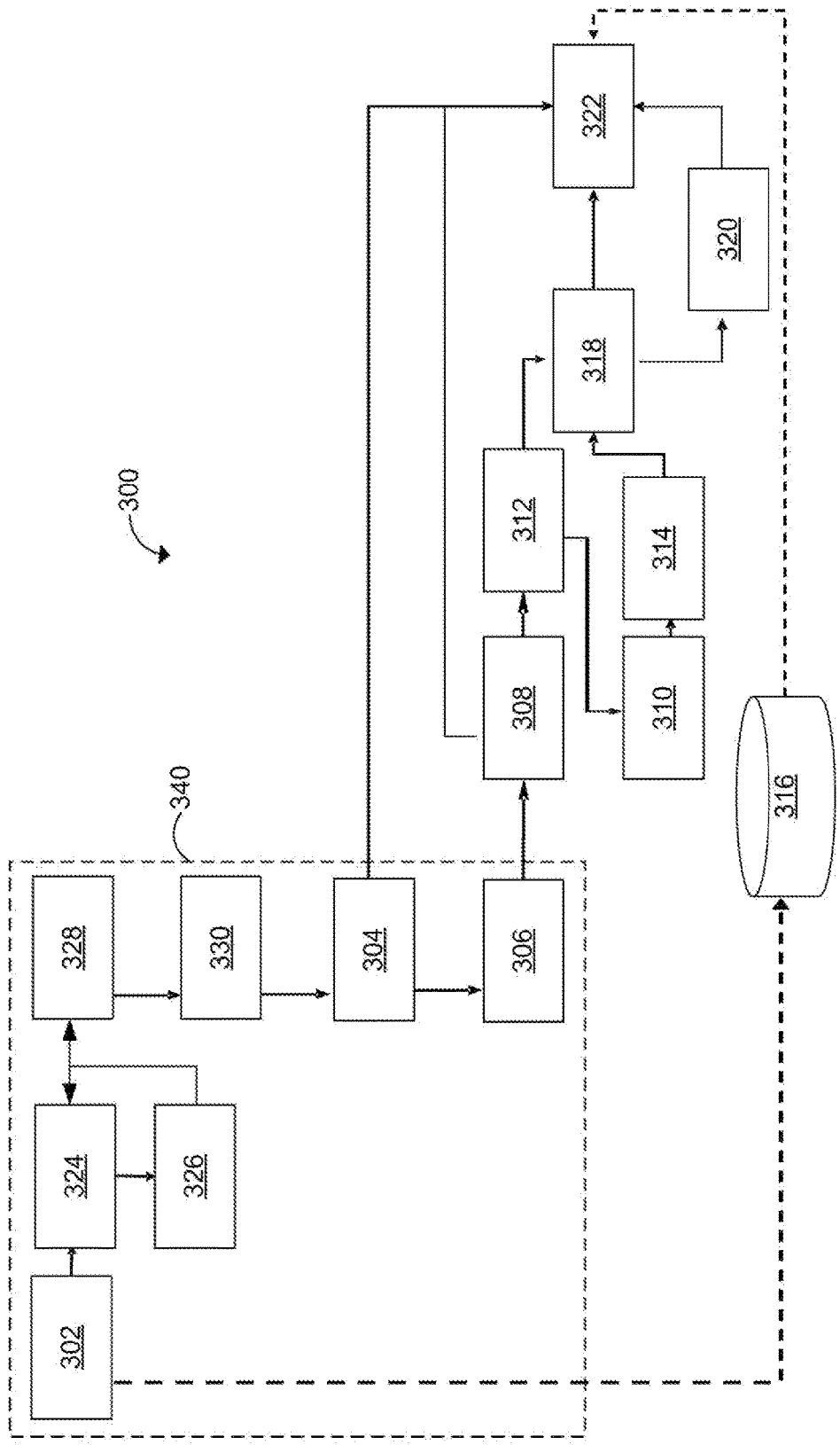
FIG. 3 is a software component diagram of the language translation system in accordance with one or more embodiments.

Referring to FIG. 3, there is shown a data architecture diagram 300 of the translation server of the language translation system. An input text element (also referred to herein as a source text element) is received at a rule-based translation module 304. The input text element 302 is in a first language. The input text element 302 may be as large as a paragraph, or may be as small as one word. In the preferred embodiment, each text element may be a phrase or a sentence.

The input text element 302 may be represented in an alphabet form, such as Latin script, a Cyrillic script, or Greek script. The input text element may be represented in a logographic form, such as Chinese characters, Japanese kanji, etc. The input text element 302 may be encoded in a variety of different character encodings, such as Unicode, UTF-8, ISO 8859, etc.

The input text element 302 may be in a variety of different input languages, for example, Chinese, Spanish, English, Hindi, Bengali, Portuguese, Russian, Japanese, etc. The input text element may further be associated with input metadata. The input metadata may include information relating to the original document of the input text element, information related to the author of the document, information relating to the subject matter of the document (for example, a text element from a finance type document, or a shareholder agreement may have metadata associated particularly with those types of documents). The input metadata for input text element 302 may be the same as the text element metadata in the document corpus (see above).

The preliminary language translation pipeline 340 includes input text element 302, sentence segmenting module 324, formatting tag stripper 326, TM matcher 328, untranslatable matcher 330, rule-based machine translation module 304, and machine translator selector module 306.

The input text element 302 may be received by sentence segmenting module 324. Sentence segmenting module 324 may determine processing units of the input text element 302 consisting of one or more words, one or more paragraphs, and one or more sentences. Sentence segmenting module 324 may identify sentence boundaries between words in different sentences. Sentence boundaries may be indicated by punctuation marks, variation in capitalizations, or spacing. Sentence segmenting module 324 may perform one or more passes on the input text element 302. For example, sentence segmenting module 324 may perform two segmenting passes on the input text element 302 where the first pass constitutes a dummy sentence segmenter which produces a result that can be used to TM-match long text and the second pass constitutes a regular sentence segmenter. Sentence segmenting module 324 may generate a list of lists of sentences as an output, i.e. a plurality of text element segments may be identified. The output including the plurality of the text element segments identified by the sentence segmenting module 324 may be sent to the formatting tag stripper 326 and the TM matcher 328.

The formatting tag stripper 326 may remove formatting tags from the input text element 302 or the output of the sentence segmenting module 324. Formatting tag stripper 326 may remove particular encoding tags, such as Unicode, etc. Alternatively, the formatting tag stripper 326 may remove HTML tags from a markdown text and generate a plain text output. Formatting tag stripper 326 may remove physical tags and/or logical tags. Formatting tag stripper 326 may also strip embedded JavaScript code, style information, and new line characters.

TM matcher 328 may receive the output of sentence segmenting module 324, formatting tag stripper 326, or both. TM matcher 328 may match the input text element 302 to text elements stored in a translation memory, the translation memory including previously translated text elements. As discussed above for TM matcher 238, some source texts are invariant across languages including but not limited to email addresses, urls, product serial numbers, etc. Translating may involve simply copying the source text element to the output text element. Those source texts may be referred to as "untranslatables".

Untranslatable matcher 330 may receive input text element 302 or the output of TM matcher 328. The Untranslatable matcher 330 refers to the untranslatable matcher 240 above. Untranslatable matcher 330 identifies text elements or segments that do not require translation. Untranslatable matcher 330 may use specified criteria to identify untranslatable text elements. Untranslatable text elements may contain characters, symbols, and words that do not need to be translated such as numbers, formulas, code, email addresses, human and product names, and currency values.

Untranslatable matcher 330 may output or flag the untranslatable text elements so that no further translation processes are attempted on the untranslatable text elements. Alternatively, untranslatable matcher 330 may output the untranslatable text element as an output text element.

The input text element 302, including the plurality of text element segments may be received at a rule-based machine translation module 304 from the untranslatable matcher 330. The rule-based machine translation module 304 has a ruleset that may determine the output text element 322 if the input text element 302 matches a rule in the ruleset. Any matching text element segments that are translated using the rule-based machine translation module 304 may be presented as part of the output text element 322.

One or more rules in the ruleset may have a regular expression that may match the input text element, and may provide a corresponding text element translation that is used at the output text element 322. The rules in the ruleset may be created to include at least one of a template, a converter and an assembler.

Rule-based machine translation model 304 may access a machine translation rule database (not shown) to retrieve existing rules and to store new rules.

An input text element 302 that does not match a rule in the rule-based machine translation module 304 may be sent to the machine translation selector module 306.

The machine translation selector module 306 may determine a selected machine translation model in the plurality of machine translation models 308. The selection may be made based on a machine translation model, such as a classifier-based machine learning model.

The classification and selection of the machine translation model may be made based upon the input text element, and additionally may be made based upon input metadata associated with the input text element. The classification and selection may be made based upon a determination of whether the input text element is in-domain for a particular machine translator in the plurality of machine translators 308. An in-domain determination may mean that the input text element is determined to be of a particular subject matter type (e.g. finance, clothing, shoes, etc.), of a particular input language (e.g. French, English, Chinese), etc.

The selected translation model in the plurality of machine translation models 308 may be a statistical machine translation model, a neural machine translation model, or a $3^{rd}$ party machine translation model. The selected translation model translates the input text element and generates a first translated text element 312. The first translated text element 312 may be sent to the post-editing module 310 and the quality evaluation module 318.

The post-editor module 310 generates a predicted post-edit to the first translated text element 312 to produce the second translated text element 314. The post-editor module 310 may have a post-editing model that may comprise a neural network. The predicted post-edit in the second translated text element may involve deleting characters, deleting words, adding characters, adding words, transposing characters, transposing words, removing accents or other diacritical characters, adding accents or diacritical characters, etc.

The post-editor module 310 generates the post-edited second translated text element 314, and sends it to the quality evaluation module 318.

The quality evaluation module 318 receives the first translated text element 312 and the second translated text element 314. The quality evaluation module 318 generates a first quality metric for the first translated text element and a second quality metric for the second translated text element. The quality evaluation module 318 may have a quality evaluation model for predicting a quality metric for a text element.

The first and second quality metrics may be compared to each other at the quality evaluation module, and the output text element may be selected based on the first text element or the second text element with the highest quality metric.

The first and second quality metrics may be compared to a threshold, and if both metrics are below the threshold, then the input text element 302 may be sent to a $3^{rd}$ party machine translation model 320 and the output text element 322 may be selected from the output of the $3^{rd}$ party translation model 320.

The first quality metric may be sent to the selected machine translation model in the plurality of machine translation models. The second quality metric may be sent to the post-editing module. The first and second quality metrics may be stored in a database (e.g. database 110 in FIG. 1) in association with the input text element 302, the first translated text element 312, and the second translated text element 314.

The output text element 322 may be stored in a cache 316. The cache entry for output text element 322 may have a cache key corresponding to the input text element. The cache entry for the output text element 322 may have a cache key corresponding to a hash of the input text element.

Figure 4:
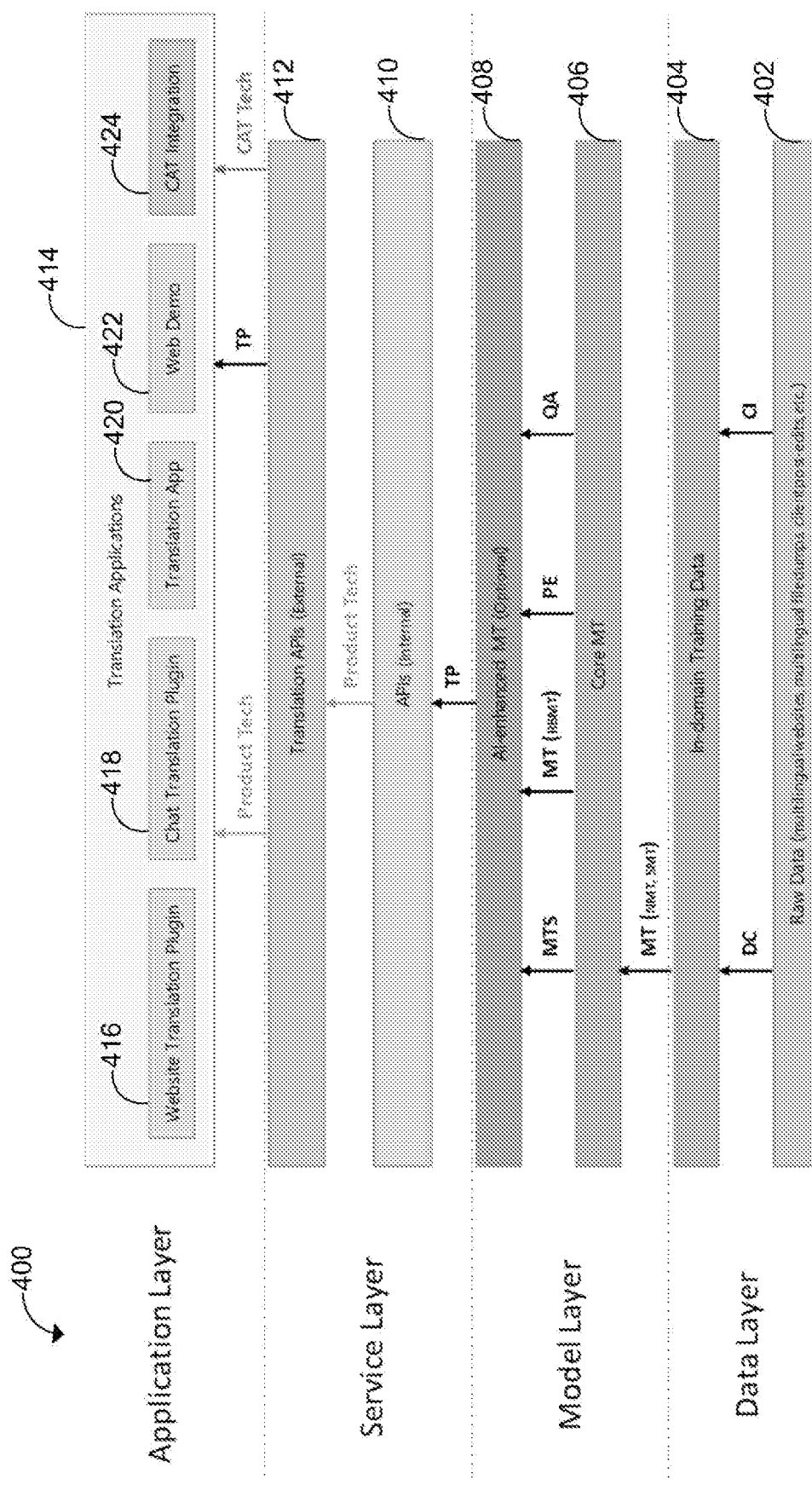
FIG. 4 is a data architecture diagram of the language translation system in accordance with one or more embodiments.

Referring to FIG. 4, there is an architecture diagram 400 of the machine translation system. The architecture of the machine translation system includes a raw data layer 402, an in-domain training data layer 404, a core machine translation layer 406, a machine learning enhanced machine translation layer 408, a plurality of APIs layer 410, a plurality of translation APIs layer 412, and an application layer 414.

The application layer 414 includes a translation plugin 416, a chat translation plugin 418, a translation app 420, a web demo 422, and a CAT integration 424.

Raw data layer 402 may be a plurality of multilingual websites, multilingual file dumps, and a plurality of multilingual client data. For example, the raw data layer 402 may include the United Nations (UN) document corpus in a plurality of languages, or the Wikipedia® document corpus. The raw data layer 402 is ingested by the language translation system, and may be stored in a database (for example, database 110 in FIG. 1). The system may determine a corpus context for each corpus that is ingested by the language translation system. The system may determine a document context for each document in each corpus that is ingested by the language translation system. This may, for example, identify particular document domains including subject matter and language.

In-domain training data layer 404, i.e. the data ingested from raw data layer 402 is used to determine a plurality of machine translation models. This may be done at a training server. The in-domain training data layer 404 may be used for training a statistical machine translation model, or a neural machine translation model. The plurality of machine translation models is provided to the core machine translation layer 406 so that language translations may be performed by the language translation system.

The core machine translation layer 406 may provide for machine translation selection, rule-based machine translation, post-editing, and quality evaluation.

The machine learning enhanced machine translation layer 408 may use the plurality of machine translation models in addition to the machine selection, post-editing, and quality evaluation functionality for machine translation. The machine translation service is provided to the internal API layer 410 by the machine learning enhanced machine translation layer 408.

The translation service is provided in the internal API layer 410 by a translation provider. The translation provider may provide a Representation State Transfer (REST) API. Such an API may respond to HTTP requests over the network, including a translation request to the internal API. The internal API layer 410 may enable requests and responses in a variety of formats, including eXtensible Markup Language (XML) or JavaScript Object Notation (JSON). The internal API layer 410 may be a $1^{st}$ party API.

The internal API layer 410 may have $1^{st}$ party software applications to provide business functionality (such as the provision of business forms) to operate aspects of the translation system. This may include the machine translation selector, language translation, post-editing, and quality evaluation. The first-party software may provide an external translation API layer 412.

The external translation API layer 412 may be provided externally to clients. The external API may be a REST API. Such an API may respond to HTTP requests over the network, including a translation request to the external API. The external API layer 412 may enable requests and responses in a variety of formats, including XML or JSON.

Client applications are shown in application layer 414. Clients of machine translation systems may develop software applications that integrate with the language translation system. Examples of client applications include a website translation plugin 416, a chat translation plugin 418, a translation app 420, a web demo 422, and a CAT integration 424. The client applications in application layer 414 may further include a rule-based machine translation application that may enable users to add, edit, or remove one of more rules used by the rule-based machine translation engine in core translation layer 406.

Figure 5:
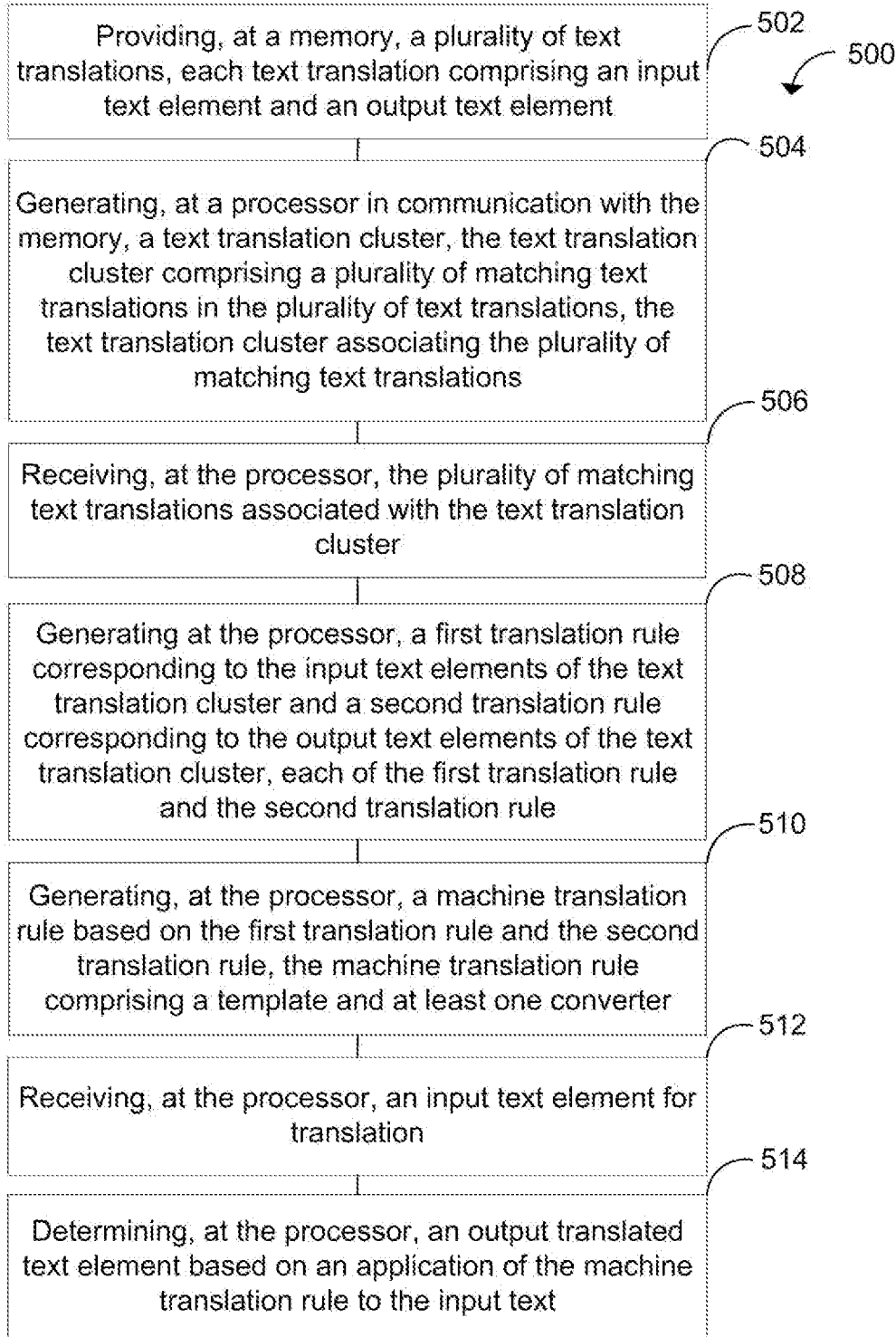
FIG. 5 is a flowchart of an example method of language translation in accordance with one or more embodiments.

Referring to FIG. 5, there is a method diagram 500 for language translation at a translation server.

At act 502, a plurality of text translations are provided at a memory. Each of the text translations in the plurality of text translations may include an input text element and an output text element. Each input text element may be associated with at least one output text element. The input text elements and output text elements may be in any language. The plurality of text translations may be provided in any format, including plain-text format, or XML markup.

At act 504, a text translation cluster is generated at a processor in communication with the memory. The text translation cluster may include a plurality of matching text translations from the plurality of text translations provided at act 502. The text translation cluster associates a plurality of matching text translations.

The text translation cluster may identify similar sentences in a set of documents corresponding to a particular domain. The text translation cluster may discover similar input text elements that are always translated to an output text element in a consistent manner. The text translation cluster may identify structurally similar text elements on the input side and the output side. The text elements may be sentences.

The text translation cluster may be generated using a clustering algorithm. For example, the processor may generate a plurality of vector-based representations from the plurality of text translations. The vector-based representations may essentially convert the text elements into vectors of numbers. The plurality of vector-based representations may be n-gram bag-of-words (BOW) vectors which comprise at least one combination of unigrams, bigrams and trigrams. The processor may perform clustering on the plurality of vector-based representations based on the vector data.

An n-gram BOW vector may capture the context in which words from the plurality of text translations are used together and the frequencies of the word occurrences in the plurality of text translations.

The processor may generate any other type of numerical representation of the plurality of text translations such as one-hot representations, distributed representations, singular value decomposition, continuous bag of words model, skip-gram model, and Glove representation.

The possible vector-based representations include a plurality of n-gram bag-of-words (BOW) vectors, and a plurality of term-frequency inverse-document frequency (TF-IDF) vectors. TF-IDF is a statistical method to measure the importance of terms within each text translation in the plurality of text translations. Term-frequency inverse-document frequency vectors may score words in the plurality of text translations by multiplying the word's Term Frequency with the Inverse Document Frequency. The Term Frequency of a word is the number of times the term appears in a document compared to the total number of words in the documents. The Inverse Document Frequency of a word reflects the proportion of text translations in the plurality of text translations that contain that term.

In an alternate embodiment, the vector-based representations may be a plurality of vectors determined using another means.

The n-gram BOW vectors may include at least one selected from the group of: a plurality of unigram vectors, a plurality of bigram vectors and a plurality of trigram vectors. The n-gram BOW vectors may include a combination of unigram vectors, bigram vectors and/or trigram vectors.

Generating a text translation cluster may also include performing clustering based on at least one of k-means clustering, agglomerative clustering, DBSCAN clustering, or any other clustering method.

At act 506, the plurality of matching text translations associated with the text translation cluster are received at a processor. There may be more than one text translation clusters generated from the plurality of text translations and received at the processor.

At act 508, a first translation rule corresponding to the input text elements of the text translation cluster and a second translation rule corresponding to the output text elements of the text translation cluster are generated at the processor. The first translation rule and the second translation rule may describe the clustered input text elements and clustered output text elements, respectively.

The first translation rule and the second translation rule may include a regular expression rule and/or a finite state automata rule. For example, a regular expression rules may be a pattern that matches the input text elements of the text translation cluster. A regular expression rule may represent the input text elements and the output text elements while accommodating for constants and variables in the text elements.

There may be at least one first translation rule and one second translation rule for each text translation cluster generated from the plurality of text translations. The first translation rules and the second translation rules may be generated automatically, semi-automatically, or manually. For example, semi-automatic generation of the first translation rules and the second translation rules may involve a third-party tool that requires manual manipulation. Semi-automatic generation may use a trained algorithm to generate a draft first or second translation rule that must be reviewed and edited by a human. The manual review may make the first translation rule and the second translation rule generalizable.

In another example, automatic generation may involve any machine learning algorithm for automatically generating a first translation rule and a second translation rule with high enough accuracy that regular manual review is not necessary.

The processor can infer regular expression patterns from the cluster of input text elements and output text elements. If more than one regular expression pattern is inferred, the processor can redefine the cluster such that only one regular expression pattern is inferred. For example, the processor may remove the input text element and the corresponding output text element that are the least similar to the other text elements in the cluster.

The first translation rule and the second translation rule for each cluster are paired and sent to the processor at act 510.

At act 510, a machine translation rule is generated based on the first translation rule and the second translation rule. The machine translation rule may include a template and a converter. The machine translation rule may include any number of templates and converters.

The template may be a representation including both static text expressions from the plurality of matching text translations as well as variable expressions. For example, the template "Forward Looking Statements 10", may include a static portion "Forward Looking Statements" and "10" may be treated as a variable portion. The template may represent rules or patterns that capture changes from an input text element to an output text element. The template may be a phrase that is consistently translated. The template may be a phrase that is commonly used in a specific domain (for example, Finance, Legal, Medicine, Engineering, Consulting, Clothing, Electronics, Travel, and Sports). The template may be adjacent to or surrounding a variable that is not translated. The template can be static text expression in any language. For example, the template may be "Forward Looking Statements" in English and "Énoncés Prospectifs" in French. Further details of templates are presented in FIG. 11.

The converter may be a representation of a variable text expression from the plurality of matching text translations. The converters may represent special types of text such as dates, numbers, ordinals, percents, currency, time zone and month. Further details of converters are presented in FIGS. 10 and 11.

Templates and converters can be combined in a machine translation rule. Templates and converters can work together where part of a text element is addressed by a template and the other part of the text element is addressed by a converter.

The machine translation rule may also include an assembler. The assembler may be a unified data structure that corresponds to at least one of a template and a converter. The assembler may assemble any number of templates and converters. For example, an assembler may assemble one template or one converter. Alternatively, an assembler may assemble one template and multiple converters. Further details of assemblers are presented in FIG. 12.

The processor may store the machine translation rule in a machine translation rule database. The processor may check whether the machine translation rule exists in the machine translation rule database prior to storing the machine translation rule to avoid storing duplicate rules.

A machine translation rule stored in the machine translation rule database can be used by rule-based translator 230 to translate input text elements.

At act 512, an input text element for translation is received at the processor. The input text element can be input text element 302. The input text element can be in any language. The input text element may be as large as a paragraph, or may be as small as one word.

At act 514, an output translated text element based on an application of the machine translation rule to the input text is determined at the processor. The processor may match the input text element to the machine translation rules stored in the machine translation rule database. If the input text element matches a machine translation rule, the processor may generate the output translated text element in the selected language using the machine translation rule.

The processor may use the machine translation rule to identify text in the input text element that matches the templates, converters, and assemblers in the machine translation rule.

Figure 6:
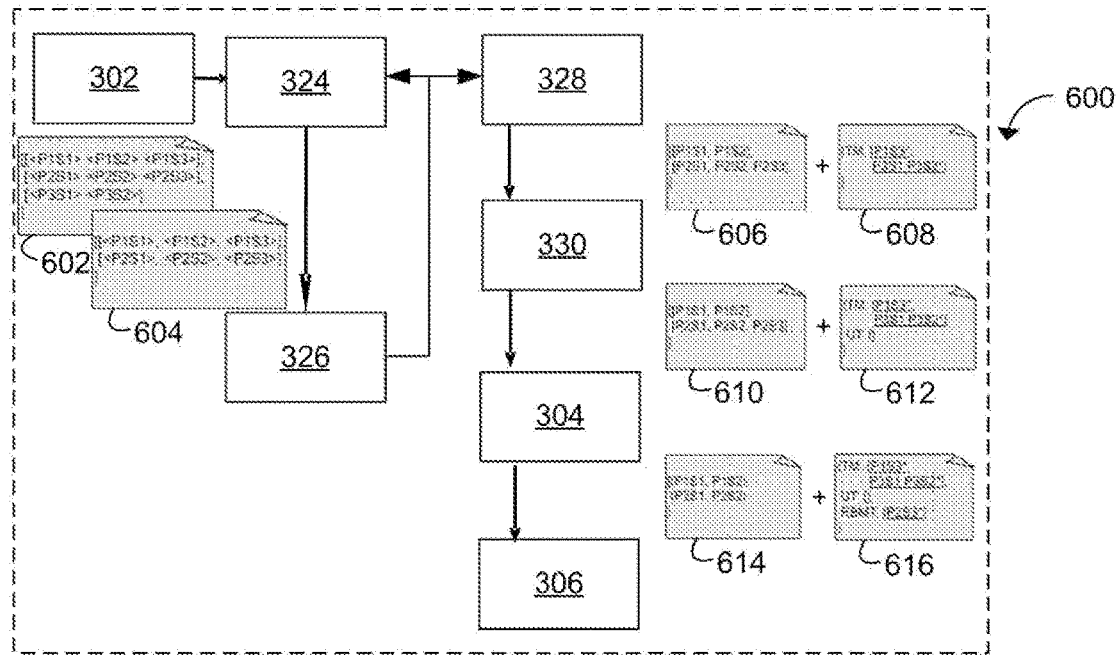
FIG. 6 is a detail view of the portion 340 in FIG. 3 for language translation in accordance with one or more embodiments.

Referring to FIG. 6, there is a detail view of the portion 340 in FIG. 3 for language translation. Detailed preliminary language translation pipeline 600 includes sentence segment files 602 and 604, TM matcher output files 606 and 608, untranslatable matcher output files 610 and 612, and rule-based machine translation module output files 614 and 616.

The output file generated by each of the translation modules (TM matcher 328, untranslatable matcher 330, and rule-based machine translation module 304) may cumulatively store the translation progress of the input text element 302. As explained further below, the output files 602, 604, 606, 608, 610, and 612 may include data that captures all translations performed on input text element 302 up until the point of generation of the output files.

Sentence segment files 602 and 604 may be generated by sentence segmenting module 324. As described in FIG. 3, sentence segmenting module 324 may generate a list of lists of sentences or text elements as an output. The list of lists of sentences or text elements may be stored in sentence segment files 602 and 604. There is shown two sentence segment files 602 and 604 but it should be understood that any number of sentence segment files may be generated by sentence segmenting module 324.

Sentence segment files 602 and 604 may be sent to formatting tag stripper 326 and TM matcher 328.

TM matcher output files 606 and 608 may be generated by TM matcher 328. TM matcher output file 606 may include the sentence segments that were not translated by TM matcher 328. TM matcher output file 608 may include the sentence segments that were translated by TM matcher 328. TM matcher output files 606 and 608 are sent to untranslatable matcher 330.

Untranslatable matcher output files 610 and 612 may be generated by untranslatable matcher 330. Untranslatable matcher output file 610 may include the sentence segments that were not translated by the preceding translation modules. For example, untranslatable matcher output file 610 may include the sentence segments that were not translated by TM matcher 328 and that were not translated by untranslatable matcher 330.

Untranslatable matcher output file 612 may include sentence segments that were translated by untranslatable matcher 330. Alternatively, untranslatable matcher output file 612 may include all previously translated sentence segments. For example, untranslatable matcher output file 612 may include the sentence segments translated by TM matcher and the sentence segments translated by untranslatable matcher 330. Untranslatable matcher output files 610 and 612 can be sent to rule-based machine translation module 304.

Rule-based machine translation module output files 614 and 616 may be generated by rule-based machine translation module 304. Rule-based machine translation module output file 614 may include the sentence segments that were not translated by the preceding translation modules. For example, rule-based machine translation module output file 614 may include the sentence segments that were not translated by TM matcher 328, untranslatable matcher 330, and rule-based machine translation module 304.

Rule-based machine translation module output file 616 may include sentence segments that were translated by rule-based machine translation module 304. Alternatively, rule-based machine translation module output file 616 may include all previously translated sentence segments. For example, rule-based machine translation module output file 614 may include the sentence segments translated by TM matcher, the sentence segments translated by untranslatable matcher 330, and the sentence segments translated by rule-base machine translation module 304. Rule-based machine translation module output files 614 and 616 can be sent to machine selector module 306.

Machine selector module 306 may attempt to translate only the sentence segments in output files 606, 610, or 614 to save processing time and resources.

Sentence segment files 602 and 604 and output files 606, 608, 610, 612, 614, and 616 may be stored in any file type using any encoding type. Sentence segment files 602 and 604 and output files 606, 608, 610, 612, 614, and 616 may be stored in cache 232 or cache 316. There is shown three pairs of output files 606, 607, 610, 612, and 614 but it should be understood that any number of output files may be generated by the translation modules (TM matcher 328, untranslatable matcher 330, and rule-based machine translation module 304).

Figure 7:
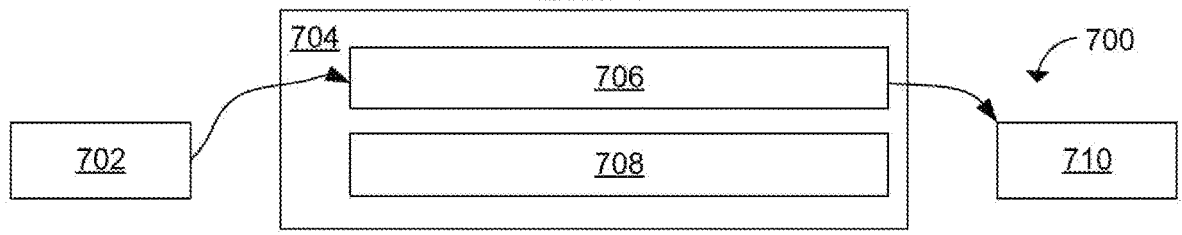
FIG. 7 is a flowchart of an example method of language translation including templates, converters and assemblers in accordance with one or more embodiments.

Referring to FIG. 7, there is a flowchart of an example method of language translation including templates, converters and assemblers. Flowchart 700 includes input text 702, assembler 704, template 706, converter 708, and output text 710.

Input text 702 can be input text element 302. Input text 702 may include only static text expression, or alternatively, a static text expression portion and a variable text expression portion. Flowchart 700 shows input text 702 corresponding to one template 706. Assembler 704 includes one template 706 that represents input text 702. Template 706 packaged by assembler 704 can be used to determine the corresponding output text 710 of input text 702.

Figure 8:
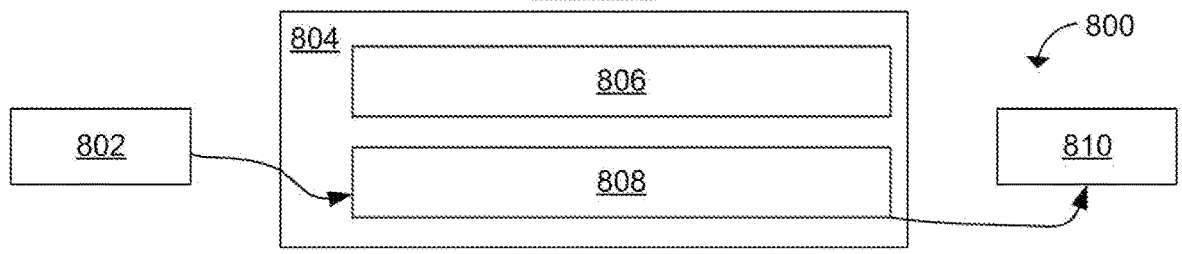
FIG. 8 is another flowchart of an example method of language translation including templates, converters and assemblers in accordance with one or more embodiments.

Referring to FIG. 8, there is another flowchart of an example method of language translation including templates, converters and assemblers. Flowchart 800 includes input text 802, assembler 804, template 806, converter 808, and output text 810.

Input text 802 can be input text element 302. Input text 802 may include only variable text expression. Flowchart 800 shows input text 802 corresponding to one converter 808. Assembler 804 includes one converter 808 that represents input text 802. Converter 808 packaged by assembler 804 can be used to determine the corresponding output text 810 of input text 802.

Figure 9:
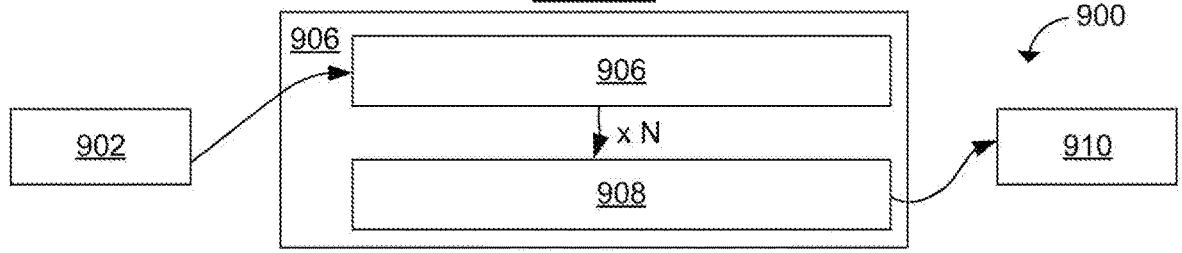
FIG. 9 is another flowchart of an example method of language translation including templates, converters and assemblers in accordance with one or more embodiments.

Referring to FIG. 9, there is another flowchart of an example method of language translation including templates, converters and assemblers. Flowchart 900 includes input text 902, assembler 904, template 906, converters 908, and output text 910.

Input text 902 can be input text element 302. Input text 902 may include both static text expression and variable text expression. Flowchart 900 shows input text 902 corresponding to one template 906 and N converters 908, where N is a positive integer.

The static text expressions of input text 902 may correspond to template 906 and the variable text expressions of input text 902 may correspond to converters 908. The number of converters may be determined by the number of independent variable text expressions in input text 902.

Assembler 906 includes one template 906 and N converters 908. Template 906 and converters 908, packaged by assembler 906 can be used to determine the corresponding output text 910 of input text 902.

Figures 10, 11:
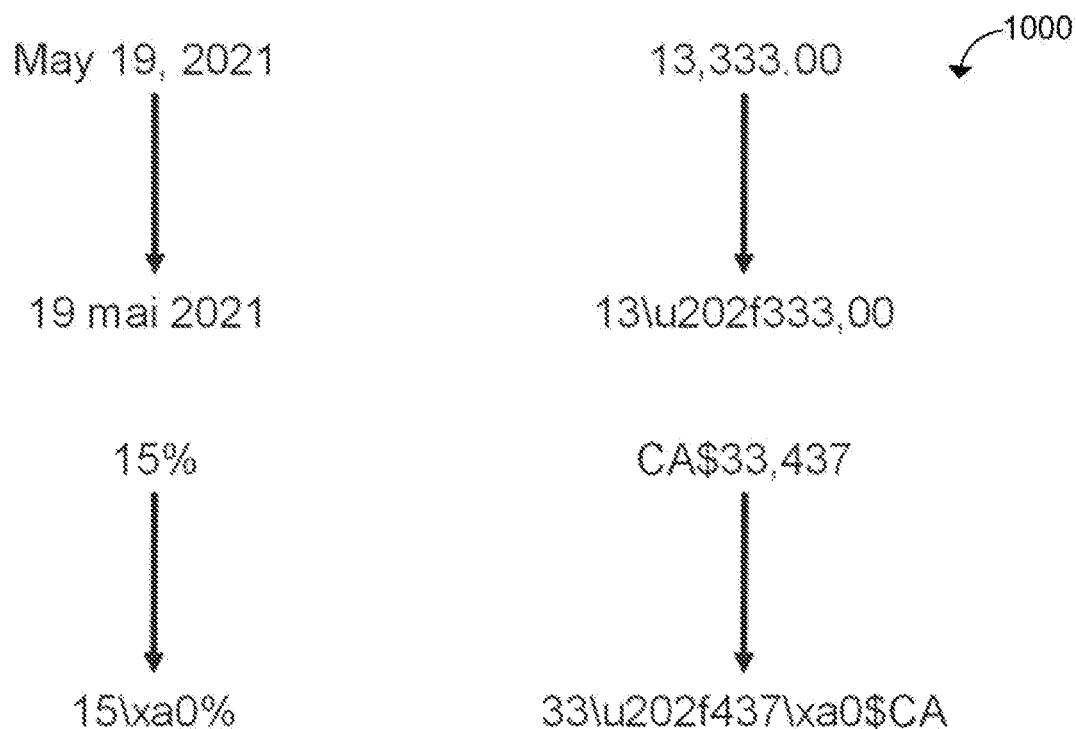
FIG. 10 is a series of example translations based on templates, converters and assemblers in accordance with one or more embodiments.
FIG. 11 is another series of example translations based on templates, converters and assemblers in accordance with one or more embodiments.

Referring to FIG. 10, there is a series of example translations based on templates, converters and assemblers. Example translation diagram 1000 shows four examples of converters. One example of a converter can translate a date expression from English to French. Another example of a converter can translate a number from English to French. Another example of a converter can translate a percentage from English to French. Another example of a converter can translate a currency from English to French.

Converters may be implemented using Babel (https://babel.pocoo.org/en/latest/), a Python package for text internationalization and localization. Particular text patterns may require the use of non-breaking spaces such as "\u202f" and "\xa0".

Referring to FIG. 11, there is another series of example translations based on templates, converters and assemblers. Example translation diagram 1100 shows an example of a template and a converter. Templates and converters often work with each other.

The static text expression shown in red in example translation diagram 1100 can be translated using a template. In example translation diagram 1100, the template translates "(Not Callable)" in English to "(non remboursable)" in French.

The variable text expression shown in black in example translation diagram 1100 can be translated using a converter. In example translation diagram 1100, the converter translates "Sep. 8, 2020" to "8 septembre 2020".

The converter in example translation diagram 1100 may be operable to translate any date in place of "Sep. 8, 2020" using the same rule. For example, if another document included the expression "May 9, 2021", the date converter in example translation diagram 1100 may be able to translate it correctly.

Figure 12:
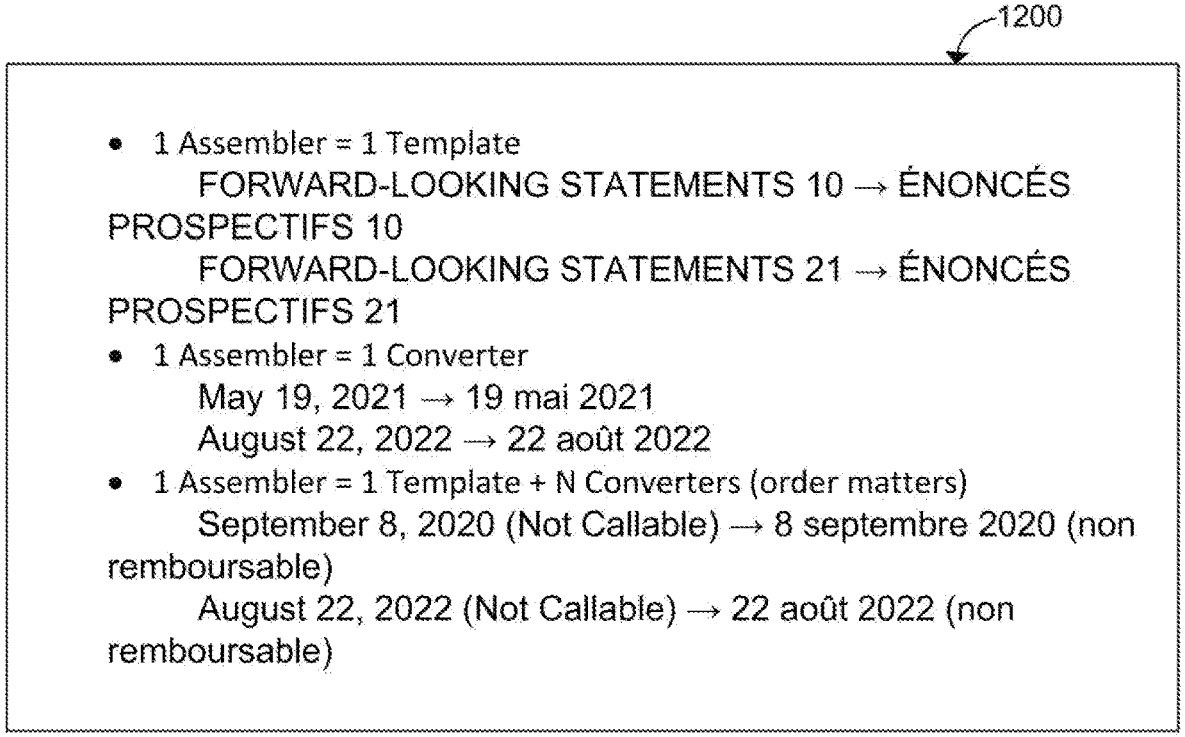
FIG. 12 is another series of example translations based on templates, converters and assemblers in accordance with one or more embodiments.

Referring to FIG. 12, there is another series of example translations based on templates, converters and assemblers. Example translation diagram 1200 shows three examples of assemblers.

Assemblers may assemble any number of templates and converters into a unified data structure. The output of rule-based machine translation module 304 may be the output of an assembler.

In the first example, an assembler is composed of one template that translates a static text portion such as, "FORWARD-LOOKING STATEMENTS". The template may include a variable such as a number that does not require special formatting to translate. For example, the number "10" may be a variable portion and can be included in the template and copied from the input text to the output text.

In the second example, an assembler is composed of one converter that translates a variable text element such as, "May 19, 2021". The converter can be a date converter. A date converter can fully translate any date string in a first language into a date string in a second language.

In the third example, an assembler is composed of one template and N converters, where N is a positive integer. The assembler may store the template and N converters in a set order. For example, the assembler may store the template first, followed by the N converters. Assemblers that combine templates and converters may be operable to translate complex phrases.

The template may translate the static text elements of the phrase. The converters may translate the variable text elements of the phrase. There may be any number of converters.

Figure 13:
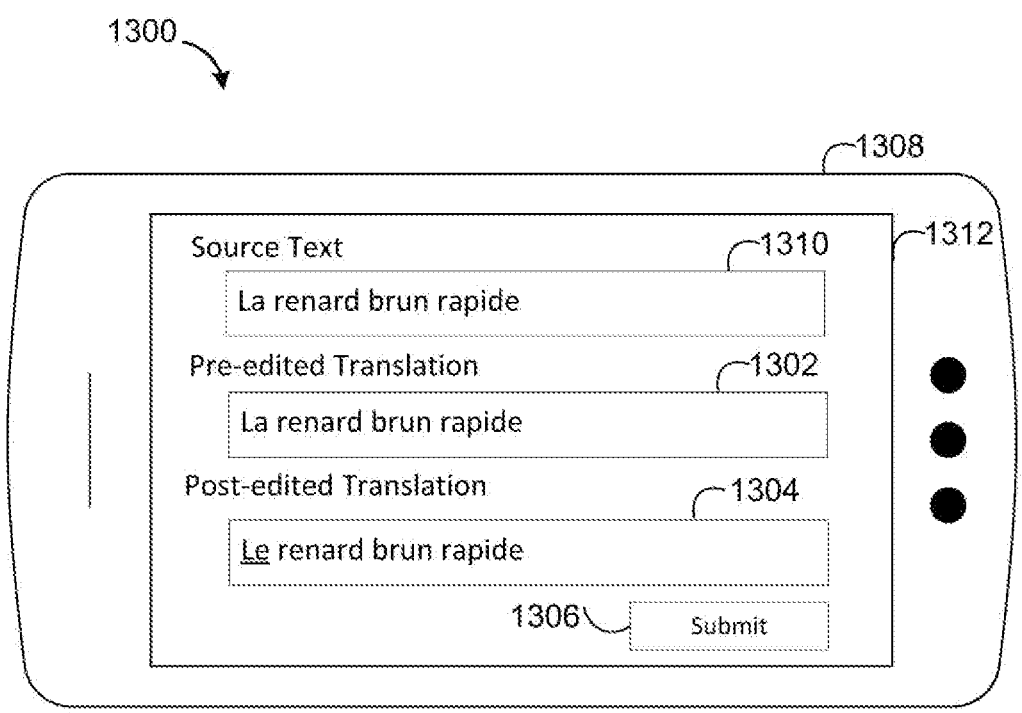
FIG. 13 is an example user interface diagram in accordance with one or more embodiments.

Referring to FIG. 13, there is an example user interface diagram 1300. User interface diagram 1300 shows user device 1308 having a display 1312 that shows the user interface. The display 1312 shows a source (also referred to herein as 'input') text element field 1310, a pre-edited translation field 1302, a post-edited translation field 1304, and a submit button 1306.

The user interface 1300 may be a software application in the application layer (see FIG. 4). Using user device 1308, a user can input source text to be translated by the machine translation system (see FIG. 4). The source text can be input text element 302. The input text element can be input text element described at acts 512 and 514 (see FIG. 5).

The user interface 1300 provides a user with the ability to view pre-edited translations and manually provide a post-edited translation. Alternatively, user interface 1300 provides a user with the ability to view automatically generated pre-edited translations and automatically generated post-edited translations.

The user interface 1300 may highlight or underline the post-edits made by a user, as shown in post-edited translation field 1304.

The user may select the submit button 1306 when they are satisfied with the post-edited translation shown in post-edited translation field 1304.

We claim:

1. A method for automatically generating rules for rule-based machine translation, the method comprising:
   receiving a plurality of text translations, each text translation comprising at least one input text element and at least one output text element corresponding to the at least one input text element;
   generating a plurality of vector-based representations of the plurality of text translations, the vector-based representations comprising at least one of an n-gram bag-of-words (BOW) vectors, a term-frequency inverse-document frequency vectors, and other vectors;
   applying a clustering algorithm to the vector-based representations to generate at least one text translation cluster, the at least one text translation cluster comprising a plurality of matching text translations from the plurality of text translations;
   generating a first translation rule corresponding to the at least one input text element of the text translation cluster and a second translation rule corresponding to the at least one output text element of the text translation cluster;
   generating a machine translation rule based on the first translation rule and the second translation rule, the machine translation rule comprising a template and at least one converter; and
   applying the machine translation rule to a received input text element to generate a corresponding output translated text element.

2. The method of claim 1, wherein the received input text element is received in a translation request; and a Rule-based Machine Translation (RBMT) component performs the applying the machine translation rule to the received input text element to generate a corresponding output translated text element.

3. The method of claim 2, wherein the machine translation rule further comprises at least one assembler, the assembler for generating a unified data structure using the template and the at least one converter.

4. The method of claim 1, wherein the n-gram bag-of-words (BOW) vectors comprise at least one selected from the group of: a plurality of unigram vectors, a plurality of bigram vectors and a plurality trigram vectors.

5. The method of claim 1, wherein the clustering algorithm is at least one selected from the group of: k-means clustering, agglomerative clustering, and density-based clustering of application with noise (DBSCAN).

6. The method of claim 1, wherein at least one of the first translation rule and the second translation rule comprises at least one selected from the group of: a regular expression rule and a finite state automata rule.

7. The method of claim 1, wherein the method further comprises storing the machine translation rule in a machine translation rule database.

8. The method of claim 7, wherein the method further comprises determining whether the machine translation rule exists in the machine translation rule database.

9. The method of claim 1, wherein the at least one converter comprises a representation of a variable text expression from the plurality of matching text translations.

10. The method of claim 1, wherein the template comprises a static representation portion of a text expression from the plurality of matching text translations and a variable portion of the text expression.

11. The method of claim 10, wherein the plurality of text translations is provided in plain-text format.

12. A system for generating rules for rule-based machine translation, the system comprising:
a memory, comprising:
a plurality of text translations, each comprising at least one input text element and at least one output text element corresponding to the at least one input text element;
a processor in communication with the memory, the processor configured to:
generate a plurality of vector-based representations of the plurality of text translations, the vector-based representations comprising at least one of an n-gram bag-of-words (BOW) vectors, a term-frequency inverse-document frequency vectors, and other vectors;
apply a clustering algorithm to the vector-based representations to generate at least one text translation cluster, the at least one text translation cluster comprising a plurality of matching text translations from the plurality of text translations;
generate a first translation rule corresponding to the at least one input text element of the text translation cluster and a second translation rule corresponding to the at least one output text element of the text translation cluster;
generate a machine translation rule based on the first translation rule and the second translation rule, the machine translation rule comprising a template and at least one converter; and
apply the machine translation rule to a received input text element to generate a corresponding output translated text element.

13. The system of claim 12, wherein the received input text element is received in a translation request; and a Rule-based Machine Translation (RBMT) component applies the machine translation rule to the received input text element to generate the corresponding output translated text element.

14. The system of claim 12, wherein the machine translation rule further comprises at least one assembler, the assembler for generating a unified data structure using the template and the at least one converter.

15. The system of claim 12, wherein the n-gram bag-of-words (BOW) vectors comprise at least one selected from the group of: a plurality of unigram vectors, a plurality of bigram vectors and a plurality trigram vectors.

16. The system of claim 12, wherein the clustering algorithm is at least one selected from the group of: k-means clustering, agglomerative clustering, and density-based spatial clustering of applications with noise (DBSCAN).

17. The system of claim 12, wherein at least one of the first translation rule and the second translation rule comprises at least one selected from the group of: a regular expression rule and a finite state automata rule.

18. The system of claim 12, wherein the processor is further configured to store the machine translation rule in a machine translation rule database.

19. The system of claim 18, wherein the processor is further configured to determine whether the machine translation rule exists in the machine translation rule database.

20. The system of claim 12, wherein the at least one converter comprises a representation of a variable text expression from the plurality of matching text translations.

21. The system of claim 12, wherein the template comprises a static representation portion of a text expression from the plurality of matching text translations and a variable representation portion of the text expression.

22. The system of claim 21, wherein the plurality of text translations is provided in plain-text format.

* * * * *